(12) United States Patent
Kumar et al.

(10) Patent No.: US 12,487,893 B2
(45) Date of Patent: Dec. 2, 2025

(54) TECHNIQUES FOR USING DATA BACKUP AND DISASTER RECOVERY CONFIGURATIONS FOR APPLICATION MANAGEMENT

(71) Applicant: Rubrik, Inc., Palo Alto, CA (US)

(72) Inventors: Abhishek Kumar, San Jose, CA (US); Muraliraja Muniraju, Fremont, CA (US); Shuhan Chen, Sunnyvale, CA (US); Oluwasoji Omiwade, Santa Clara, CA (US); Junchao Zhang, Newark, CA (US)

(73) Assignee: Rubrik, Inc., Palo Alto, CA (US)

( * ) Notice: Subject to any disclaimer, the term of this patent is extended or adjusted under 35 U.S.C. 154(b) by 115 days.

(21) Appl. No.: 17/879,729

(22) Filed: Aug. 2, 2022

(65) Prior Publication Data

US 2024/0045770 A1 Feb. 8, 2024

(51) Int. Cl.
*G06F 11/14* (2006.01)
*G06F 9/455* (2018.01)
*G06F 11/20* (2006.01)

(52) U.S. Cl.
CPC ...... G06F 11/1464 (2013.01); G06F 9/45558 (2013.01); *G06F 2009/4557* (2013.01); *G06F 2009/45583* (2013.01); *G06F 2201/815* (2013.01)

(58) Field of Classification Search
CPC ............ G06F 9/4557; G06F 9/45558; G06F 9/45583; G06F 11/1464; G06F 2009/4557; G06F 2009/45583; G06F 2201/815
See application file for complete search history.

(56) References Cited

U.S. PATENT DOCUMENTS

| | | | |
|---|---|---|---|
| 10,204,019 B1 * | 2/2019 | Talley | G06F 16/119 |
| 10,417,099 B1 * | 9/2019 | Yadav | G06F 11/1453 |
| 2010/0138830 A1 * | 6/2010 | Astete | G06F 9/45533 718/1 |
| 2015/0095424 A1 * | 4/2015 | Shimada | H04L 41/0893 709/204 |
| 2015/0378765 A1 * | 12/2015 | Singh | G06F 3/04847 718/1 |
| 2016/0092266 A1 * | 3/2016 | Bavishi | G06F 9/5016 718/1 |
| 2016/0170793 A1 * | 6/2016 | Decusatis | H04L 43/0817 718/1 |
| 2019/0294477 A1 * | 9/2019 | Koppes | G06F 9/5072 |
| 2019/0324785 A1 * | 10/2019 | Weissman | G06F 9/45558 |
| 2020/0019469 A1 * | 1/2020 | Khan | G06F 9/45533 |

* cited by examiner

*Primary Examiner* — Kuen S Lu
(74) *Attorney, Agent, or Firm* — Holland & Hart LLP

(57) ABSTRACT

A data management platform may group a first instance of a set of virtual machines into a backup group for performing a backup of data from a source data storage environment to a target data storage environment in accordance with a backup configuration. The data management platform may receive, from a user, an input to create a second instance of the set of virtual machines at the target data storage environment. In some examples, data backed up to the target data storage environment from the first instance may be configured as a source for the second instance. The data management platform may instantiate, in response to receiving the input, the second instance of the set of virtual machines using the backup configuration for the first instance of the set of virtual machines and the data backed up to the target data storage environment.

20 Claims, 13 Drawing Sheets

TECHNIQUES FOR USING DATA BACKUP AND DISASTER RECOVERY CONFIGURATIONS FOR APPLICATION MANAGEMENT

FIELD OF TECHNOLOGY

The present disclosure relates generally to database systems and data processing, and more specifically to techniques for using data backup and disaster recovery configurations for application management.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A user of a data management and backup system may create a new application (e.g., for temporary use) that includes a collection of virtual machines that are backed up by the data management system. To create this new collection of virtual machines, the user may use templates (resources, network configurations, post scripts, etc.) from an existing application. However, for each deployment of the new set of virtual machines, the user may write a new set of scripts and may re-configure the virtual machines. Such a process for creating new applications may be time consuming and error prone.

One or more aspects of the present disclosure provide for techniques for grouping a first set of virtual machines into a blueprint (including the relevant post scripts and network/internet protocol (IP) configurations), and using the blueprint as the basis to create a new application (and configure an associated second set of virtual machines) and then destroy the new application once the customer is finished using the new application. In particular, a user may select the first set of virtual machines for inclusion in a blueprint for backing up data to a target datastore. The present disclosure provides for initiating a second set of virtual machines at the target datastore using a data configuration from the blueprint of the first set of virtual machines. According to one or more aspects, the target datastore (e.g., the target destination for backing up data from the first set of virtual machines) may serve as the source datastore for the new, second set of virtual machines (e.g., second instance of virtual machines). For instance, the data management system may create a copy of the virtual machines included in the blueprint in accordance with the configuration included in the blueprint. The data management system may then create a new blueprint at the target datastore. That is, the data management system may use data stored in a target datastore and data configuration from a blueprint to initiate an application including a set of virtual machines at the target datastore. According to one or more aspects of the present disclosure, the data management system may also provide for deletion of the newly initiated virtual machines. For instance, upon receiving a deletion request, the data management system may delete a blueprint created for the new set of virtual machines, thereby removing the set of virtual machines, the configurations associated with the set of virtual machines, and the metadata associated with the set of virtual machines.

Aspects of the disclosure are initially described in the context of an environment supporting an on-demand database service. Aspects of the disclosure are further illustrated by and described with reference to apparatus diagrams, system diagrams, and flowcharts that relate to techniques for using data backup and disaster recovery configurations for application management.

Figure 1:
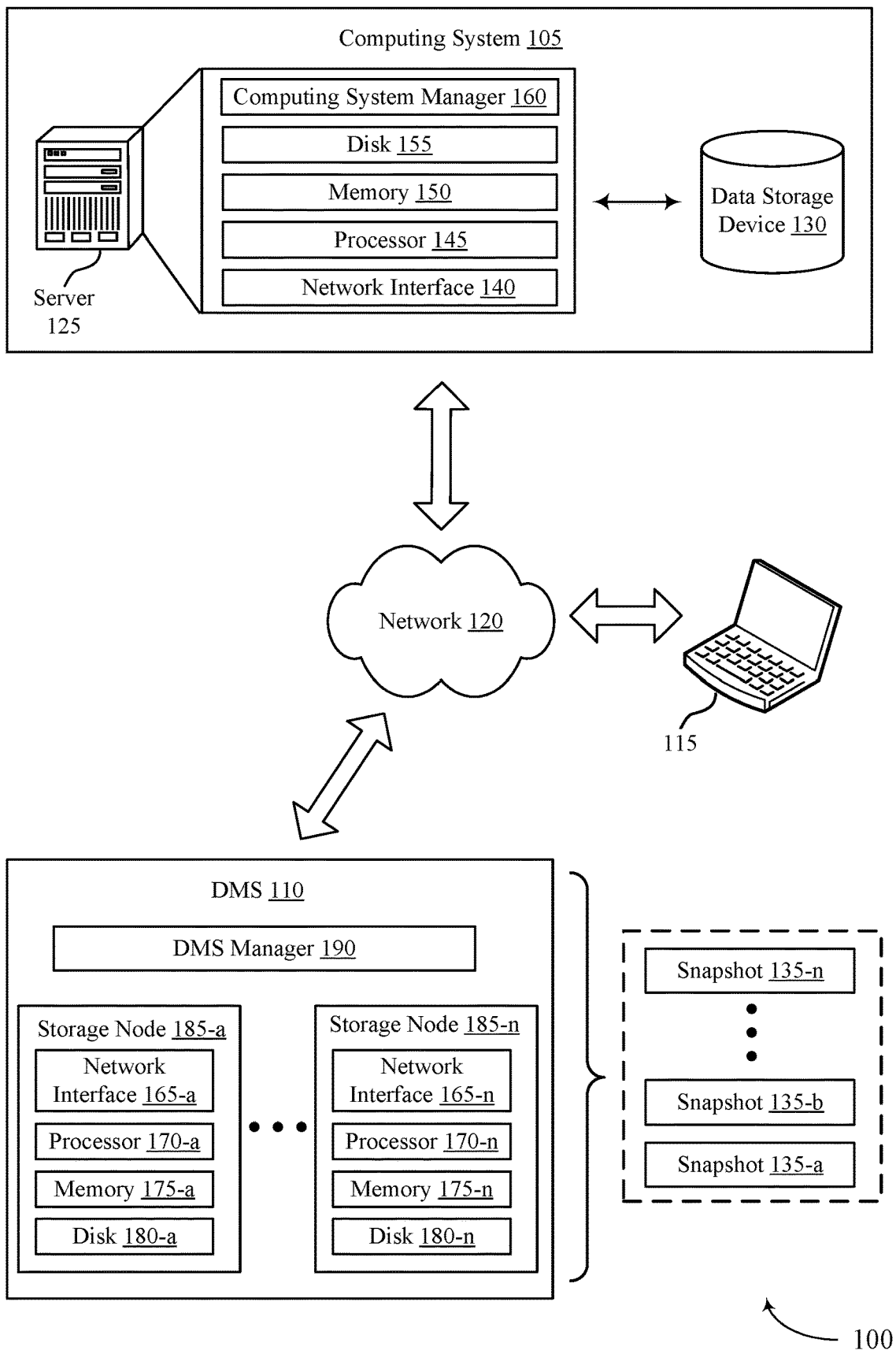
FIG. 1 illustrates an example of a method for data management system that supports techniques for using data backup and disaster recovery configurations for application management in accordance with aspects of the present disclosure.

FIG. 1 illustrates an example of a computing environment 100 for cloud computing that supports techniques for using data backup and disaster recovery configurations for application management in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

Cloud data protection provides for protecting data at a large scale. In some examples, the computing system 105 may provide for backing up data from a data source environment to a target data storage environment. The computing system 105 may provide protection for data against ransomware, corruption, accidental deletion, and purposeful deletion. Some use cases of data restoration or recovery may also include a user creating a new application (e.g., for temporary use) that includes a collection of virtual machines that are backed up by the data management system. Such application creation may include a user writing scripts to implement new configuration and networking for the new application. Thus, application creation from an existing instance of virtual machines may consume a large amount of time and resources.

The computing system 105 may utilize techniques depicted in the present disclosure to perform a data backup and disaster recovery for application management using a backup configuration. The computing system 105 may group a first instance of a set of virtual machines into a backup group for performing a backup of data from a source data storage environment to a target data storage environment in accordance with a backup configuration. The computing system 105 may receive, from a user of a data management platform (e.g., via user device 115), an input to create a second instance of the set of virtual machines at the target data storage environment. In some cases, data backed up to the target data storage environment from the first instance of the set of virtual machines may be configured as a source for the second instance of the set of virtual machines. The computing system 105 may also instantiate, in response to receiving the input, the second instance of the set of virtual machines using the backup configuration for the first instance of the set of virtual machines and the data backed up to the target data storage environment. In some examples, the first instance may be independent from the second instance. In some examples, the backup configuration may include at least one of compute resources for the target data storage environment, datastore resource for the target data storage environment, network configuration for the target data storage environment, one or more post scripts, a delay between priority groups of data, or a combination thereof.

Figure 2:
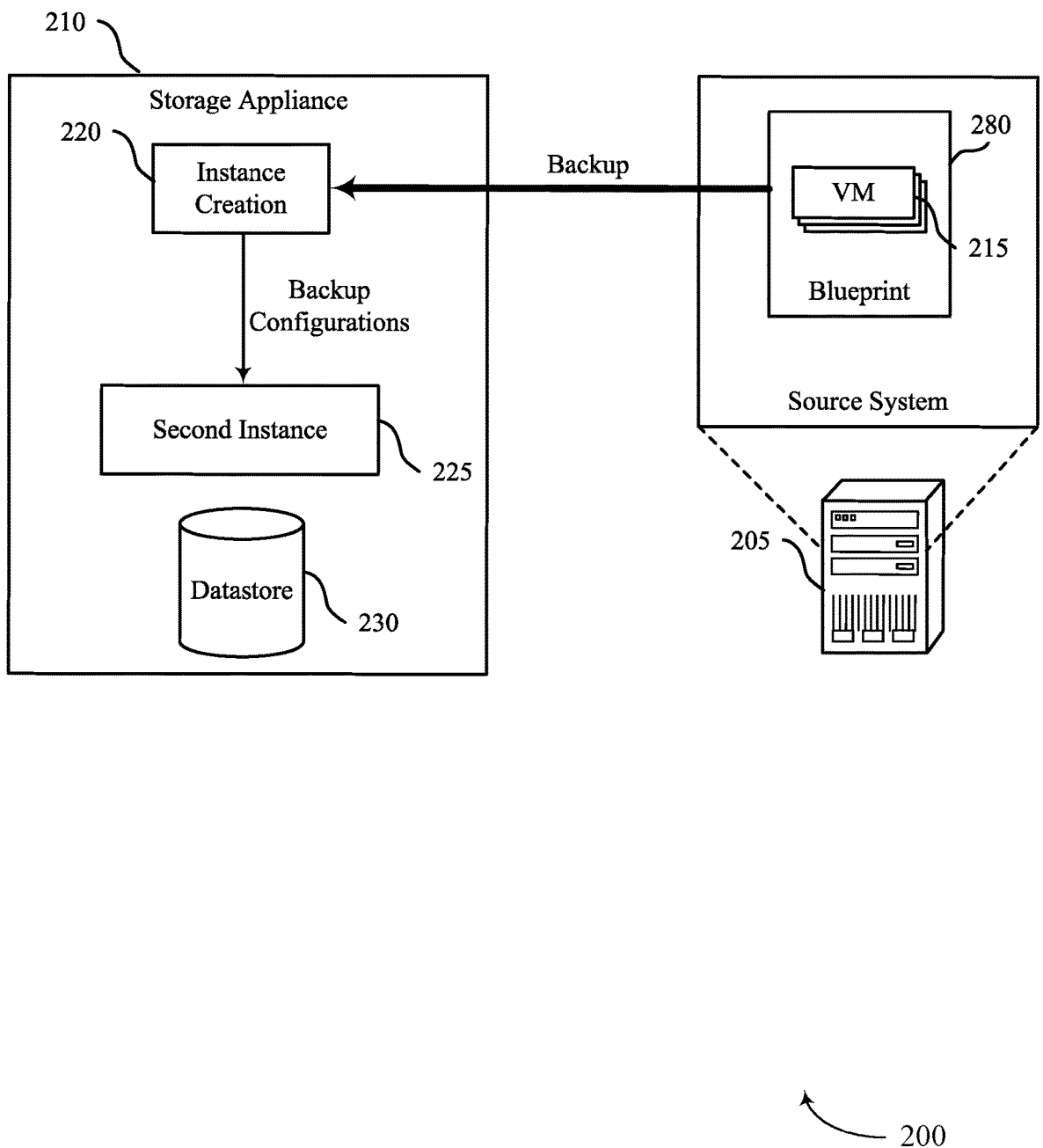
FIG. 2 illustrates an example of a computing system that supports techniques for using data backup and disaster recovery configurations for application management in accordance with aspects of the present disclosure.

FIG. 2 illustrates an example of a computing system 200 that supports techniques for using data backup and disaster recovery configurations for application management in accordance with aspects of the present disclosure. The computing system 200 includes a data management server 205. The data management server 205 may manage data for a user (e.g., a user of a device described with reference to FIG. 1). The data management server 205 may manage a set of data centers. The data centers may be geographically separated from each other. As depicted in the example of FIG. 2, the data management server 205 may offer an on-demand storage and computing services to the user. In some cases, the data management server 205 may be an example of a storage system with built-in data management. The data management server 205 may serve multiple users with a single instance of software. However, other types of systems may be implemented, including—but not limited to—client-server systems, mobile device systems, and mobile network systems. The data management server 205 may be an example of an integrated data management and storage system. The data management server 205 may include an application server. The data management server 205 may represent a unified storage system even though numerous storage nodes may be connected together and the number of connected storage nodes may change over time as storage nodes are added to or removed. The data management server 205 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 supports multiple data centers. Additionally, or alternatively, the computing system 200 may support a source system and a storage appliance 210. The storage appliance 210 may host or otherwise support a target data storage environment. A user may request to group a set of virtual machines at the source system. Utilizing the techniques depicted herein, the computing system 200 may manage instance creation and deletion of virtual machines across different storage appliances.

The source system may group a first instance of a set of virtual machines 215 into a backup group (e.g., blueprint 280) for performing a backup of data from a source data storage environment (e.g., source system) to a target data storage environment (e.g., storage appliance 210) in accordance with a backup configuration. A blueprint 280 may include a set of snappables grouped by the user and labeled as a blueprint for disaster recovery purposes. In some cases, an application may be deployed inside the snappables.

According to one or more aspects, a user may use blueprints to protect the user's virtual machines from disaster and ransomware. Blueprints may provide a logical grouping of virtual machines. In some aspects, a blueprint (e.g., blueprint 280) may include one or more building blocks or configurations that define a group of virtual machines as part of the same business service or application. In some cases, a user may identify a set of virtual machines 215 which are important and are connected under the blueprints (e.g., under blueprint 280). When selecting or inputting the backup configuration, the user may indicate the backup configuration including at least one of compute resources for the target data storage environment, datastore resource for the target data storage environment, network configuration for the target data storage environment, one or more post scripts, a delay between priority groups of data, or a combination thereof. The computing system 200 may support local recovery and remote recovery of a set of virtual machines. In case of a local recovery, the computing system 200 may support overwriting the existing virtual machines during recovery. During remote recovery, the computing system 200 may support creating a new virtual machine on the target storage environment (e.g., storage appliance 210) and deprecate the virtual machines on the source. Thus, during current recoveries the number of active virtual machines in the computing system 200 remains same.

The computing system 200 may support expansion and contraction of virtual machines. In some examples, instead of using blueprints as a tool to orchestrate the recovery of selected virtual machines, the computing system 200 may support moving virtual machines from one place to another in case of remote recovery and replacing them in case of local recovery. To support extraction, the computing system 200 may create a replica of the existing blueprint. For instance, to generate a new instance of a set of virtual machines, the computing system 200 may support creating replicas of the virtual machines which are part of the blueprint and creating a new blueprint to represent this newly created application. Additionally, or alternatively, the computing system 200 may support contraction of a blueprint. For example, the computing system 200 may support destroying the blueprint which is created as part of the expansion workflow. Destroying the blueprint may be different from deleting the blueprint. For instance, in order to delete a blueprint, the computing system 200 may remove the virtual machine's metadata which is stored as part of the blueprint without removing the virtual machines. On the other hand, for destroying the blueprint, the computing system 200 may remove the virtual machines and clean up the space consumed by these virtual machines, apart from removing the metadata.

In some examples, the computing system 200 (at the source system) may receive an input to create a second instance of the set of virtual machines 215 at the target data storage environment (e.g., storage appliance 210). Upon receiving the request from the user, the computing system 200 may perform an instance creation operation 220. For example, the computing system 200 may generate the second instance 225 of the set of virtual machines (e.g., virtual machines 215 included in blueprint 280) using the storage appliance as a source for the second instance 225. That is, data backed up to the target data storage environment (e.g., storage appliance 210) from the first instance of the set of virtual machines (e.g., virtual machines 215 grouped in blueprint 280) may be configured as a source for the second instance 225 of the set of virtual machines. In some examples, the second instance 225 may be instantiated using a backup configuration. For instance, the computing system 200 may instantiate, in response to receiving the input, the second instance of the set of virtual machines using the backup configuration for the first instance of the set of virtual machines and the data backed up to the target data storage environment. In some examples, the computing system 200 may use metadata from datastore 230 to instantiate the second instance of the set of virtual machines.

Figure 3:
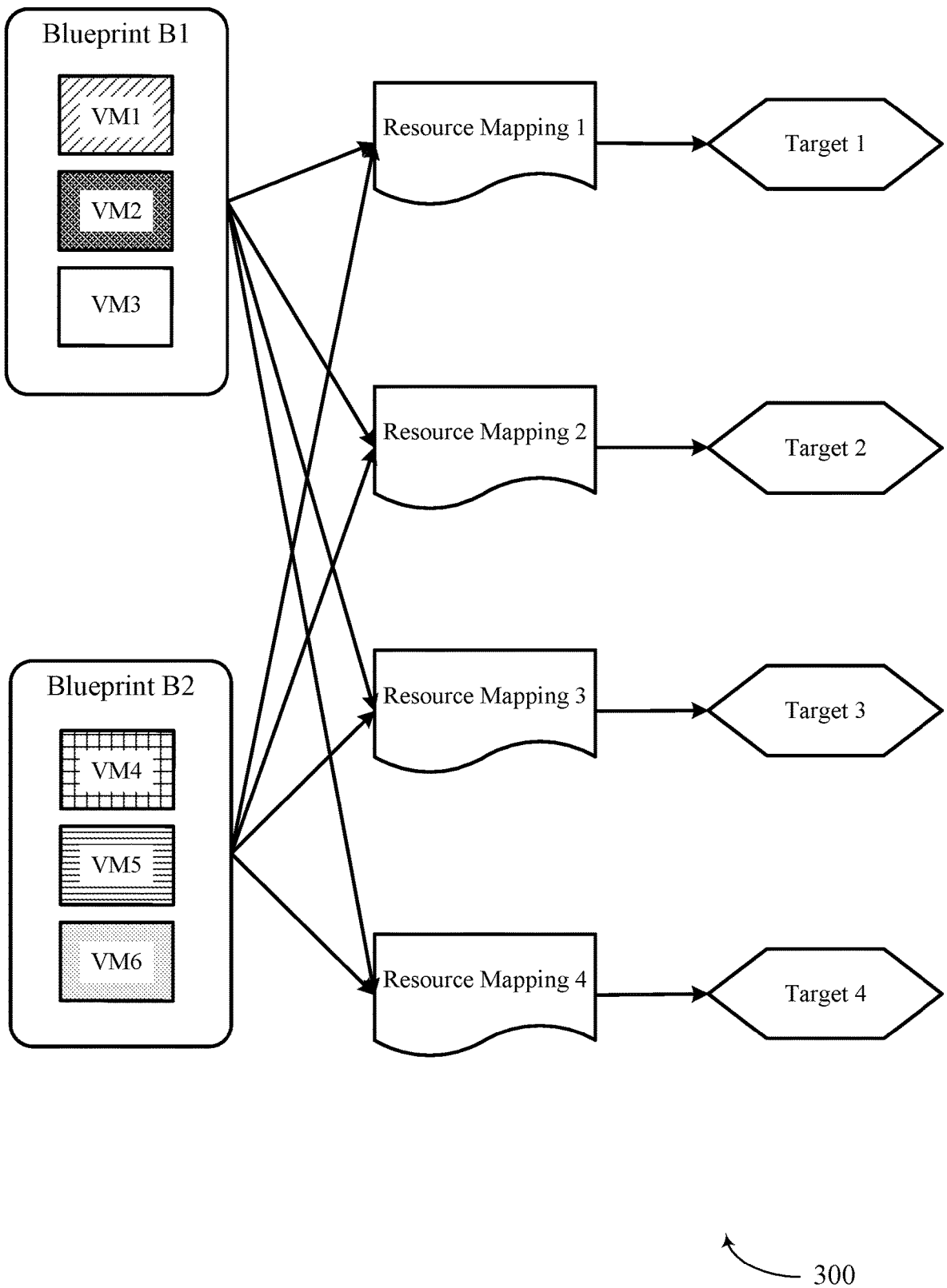
FIG. 3 illustrates an example of a computing system that supports techniques for using data backup and disaster recovery configurations for application management in accordance with aspects of the present disclosure.

FIG. 3 illustrates an example of a computing system 300 that supports techniques for using data backup and disaster recovery configurations for application management in accordance with aspects of the present disclosure. According to one or more aspects of the present disclosure, the computing system 300 may support a mapping between a set of blueprints and a set of target storage devices. The mapping may provide a process of configuring how to provision recovered instances in the secondary site in case of a failover.

As depicted in the example of FIG. 3, the computing system 300 may receive a request to group a first set of virtual machines (VM1, VM2 and VM3) into a first blueprint B1 and a second set of virtual machines (VM4, VM5 and VM6) into a second blueprint B2. The blueprints may also be referred to as a backup group for performing a backup of data from a source data storage environment to a target data storage environment in accordance with a backup configuration. That is, the first blueprint B1 may include or otherwise represent a first data backup group for performing a backup of the first set of virtual machines (VM1, VM2 and VM3) to at least a first target storage device. Additionally, or alternatively, the second blueprint B1 may include or otherwise represent a second data backup group for performing a backup of the second set of virtual machines (VM4, VM5 and VM6) to at least a second target storage device. For each target storage device, the computing system 300 may maintain a resource mapping. In the example of FIG. 3, each blueprint may be configured to be able to failover to multiple targets. The computing system 300 may maintain different resource mappings for a single blueprint. For instance, the first blueprint B1 may be associated with four resource mappings (resource mapping 1, resource mapping 2, resource mapping 3, and resource mapping 4). Additionally, the second blueprint B2 may be associated with four resource mappings (resource mapping 1, resource mapping 2, resource mapping 3, and resource mapping 4). In the example of FIG. 3, the resource mapping 1 is associated with the target 1, the resource mapping 2 is associated with the target 2, the resource mapping 3 is associated with the target 3, and the resource mapping 4 is associated with the target 4. For example, in case of a failover, the virtual machines of a particular blueprint may be retrieved from the target storages using the resource mappings. The computing system 300 may use the techniques depicted with reference to FIG. 3 to expand an application to different locations using one blueprint.

Figure 4:
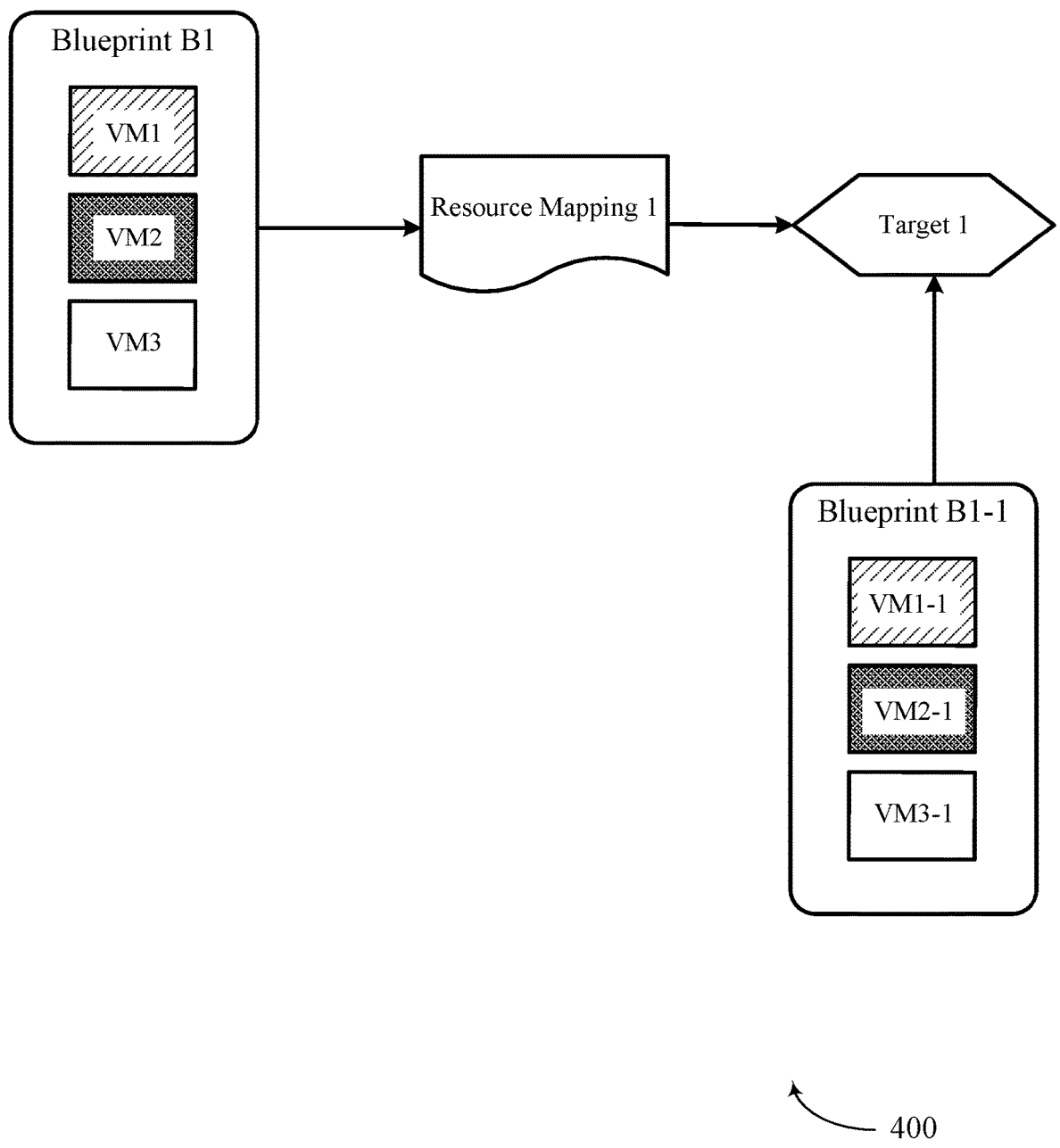
FIG. 4 illustrates an example of a computing system that supports techniques for using data backup and disaster recovery configurations for application management in accordance with aspects of the present disclosure.

FIG. 4 illustrates an example of a computing system 400 that supports techniques for using data backup and disaster recovery configurations for application management in accordance with aspects of the present disclosure. According to one or more aspects of the present disclosure, the computing system 400 may maintain a mapping between a set of blueprints and a target storage device. As depicted in the example of FIG. 4, the computing system 400 may group a first set of virtual machines (VM1, VM2 and VM3) into a blueprint B1. For example, the computing system 400 may group a first instance of a set of virtual machines (VM1, VM2 and VM3) into a backup group (corresponding to blueprint B1) for performing a backup of data from a source data storage environment to a target data storage environment (e.g., target 1) in accordance with a backup configuration.

The computing system 400 may maintain a resource mapping 1 for the blueprint B1. In some examples, the set of virtual machines (VM1, VM2 and VM3) may be backed up to the target 1 such that in case of a failover, the set of virtual machines (VM1, VM2 and VM3) may be retrieved from the target 1 in accordance with the resource mapping 1. In some examples, the computing system may receive, from a user, an input to create a second instance of the set of virtual machines (VM1, VM2 and VM3) at the target 1. In some examples, the computing device may use the data backed up to the target data storage environment (target 1)

from the first instance of the virtual machines (VM1, VM2 and VM3) as a source for the second instance of the set of virtual machines. For example, the computing system 400 may generate a new application replicating the virtual machines (VM1, VM2 and VM3) using the backed up versions of the set of virtual machines (VM1, VM2 and VM3) as a source. The computing system 400 may instantiate, in response to receiving the input, the second instance of the set of virtual machines using the backup configuration for the first instance of the set of virtual machines and the data backed up to the target data storage environment. As depicted in the example of FIG. 4, the computing system 400 may generate a blueprint B1-1 including the second instance of the set of virtual machines (including VM1-1, VM2-1 and VM3-1). The blueprint B1-1 may be a replica of the existing blueprint B1 but with newly created virtual machines (that are replicas of the virtual machines VM1, VM2 and VM3). In some examples, the user may indicate the backup configuration for the set of virtual machines and the computing system 400 may use the backup configuration to back up the set of virtual machines (by creating the blueprint B1).

Apart from instantiating a new instance of virtual machines, the computing system 400 may recover data from the target 1 using the blueprint B1. For example, the computing system 400 may receive, from a user, a request to recover the data from the target data storage environment (e.g., target 1). The computing system 400 may recover, in response to receiving the request, the data from the target 1 in accordance with the backup configuration (e.g., blueprint B1). Additionally, or alternatively, the computing system 400 may expand the deployment of applications. For example, the computing system 400 may receive a second input to create a third instance of a subset of the set of virtual machines at the target data storage environment. Although not depicted in the example of FIG. 4, the computing system 400 may receive a request to replicate a subset of the virtual machines (VM1, VM2 and VM3). In such cases, the computing system 400 may instantiate, in response to receiving the second input, the third instance of the subset of the set of virtual machines (VM1, VM2 and VM3) using the backup configuration (e.g., blueprint B1) for the first instance of the set of virtual machines (VM1, VM2 and VM3) and the data backed up to the target data storage environment (target 1). For example, the computing system 400 may instantiate multiple instances of virtual machines based on a single blueprint.

Figure 5:
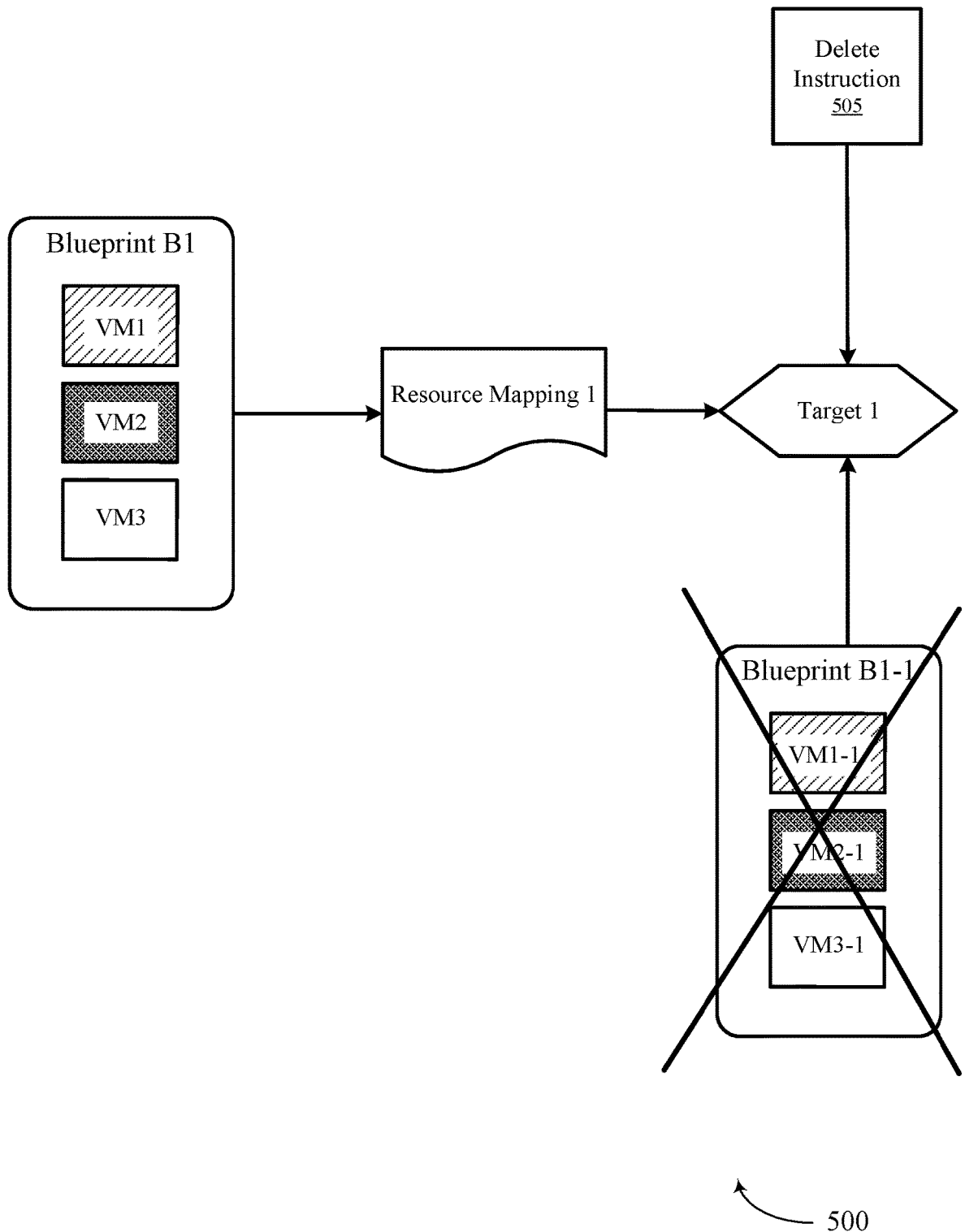
FIG. 5 illustrates an example of a computing system that supports techniques for using data backup and disaster recovery configurations for application management in accordance with aspects of the present disclosure.

FIG. 5 illustrates an example of a computing system 500 that supports techniques for using data backup and disaster recovery configurations for application management in accordance with aspects of the present disclosure. According to one or more aspects of the present disclosure, the computing system 500 may maintain a mapping between a set of blueprints and a target storage device. As depicted in the example of FIG. 5, the computing system 500 may group a first set of virtual machines (VM1, VM2 and VM3) into a blueprint B1. For example, the computing system 500 may group a first instance of a set of virtual machines (VM1, VM2 and VM3) into a backup group (corresponding to blueprint B1) for performing a backup of data from a source data storage environment to a target data storage environment (e.g., target 1) in accordance with a backup configuration.

The computing system 500 may maintain a resource mapping 1 for the blueprint B1. In some examples, the computing system 500 may receive, from a user, an input to create a second instance of the set of virtual machines (VM1, VM2 and VM3) at the target 1. In response, the computing system 500 may generate a new application replicating the virtual machines (VM1, VM2 and VM3) using the backed up versions of the set of virtual machines (VM1, VM2 and VM3) as a source. As depicted in the example of FIG. 4, the computing system 500 may generate a blueprint B1-1 including the second instance of the set of virtual machines (including VM1-1, VM2-1 and VM3-1).

In some examples, the computing system 500 may receive, from the user of a data management platform, a second input (e.g., deletion instruction 505) to delete the second instance of the set of virtual machines at the target 1. In response, the computing system 500 may delete the second instance of the set of virtual machines from the target 1. Upon receiving the deletion instruction, the computing system 500 may identify a set of configurations associated with the second instance of the set of virtual machines (e.g., VM1-1, VM2-1 and VM3-1). The computing system 500 may also retrieve metadata associated with the second instance of the set of virtual machines. When deleting the second instance of the set of virtual machines, the computing system 500 may delete the set of configurations associated with the second instance of the set of virtual machines and the metadata associated with the second instance of the set of virtual machines. Thus, the techniques depicted herein provide for a technique to destroy applications via single click from multiple targets. The computing system may use blueprints to deploy one or more applications (e.g., create virtual machines that are part of an application) to multiple targets and may destroy the applications by removing all metadata associated with the applications.

Figure 6:
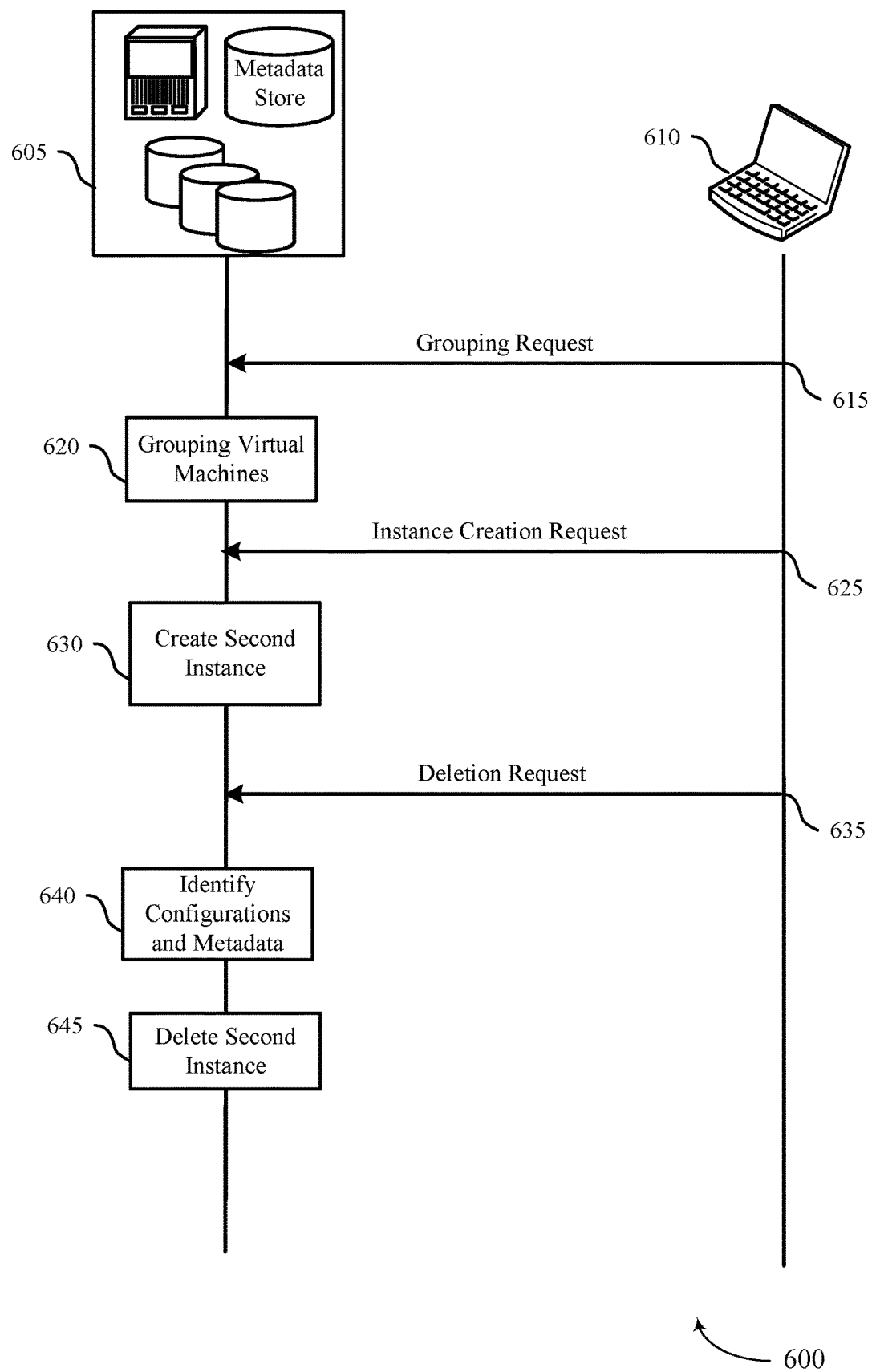
FIG. 6 illustrates an example of a process flow that supports techniques for using data backup and disaster recovery configurations for application management in accordance with aspects of the present disclosure.

FIG. 6 illustrates an example of a process flow 600 that supports techniques for using data backup and disaster recovery configurations for application management in accordance with aspects of the present disclosure. The process flow 600 includes a data management platform 605 and a user device 610. The data management platform 605 may include an application server, a metadata storage and multiple data centers of a computing cluster as described with respect to FIGS. 3, 4, and 5. The user device 610 may be an example of a user device as described with respect to FIGS. 4 and 5. Although a single entity is depicted as data management platform 605, it may be understood that components of the data management platform 605 may be located in different locations.

In some examples, the operations illustrated in the process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 615, the data management platform 605 may receive, from a user of a data management platform using the user device 610, a request to group a first instance of a set of virtual machines.

At 620, the data management platform 605 may group the first instance of the set of virtual machines into a backup group for performing a backup of data from a source data storage environment to a target data storage environment in accordance with a backup configuration. In some examples, the data management platform 605 may receive, from the user of the data management platform, the backup configuration for the set of virtual machines.

At 625, the data management platform 605 may receive, from the user of the data management platform, an input to create a second instance of the set of virtual machines at the target data storage environment. In some cases, data backed up to the target data storage environment from the first instance of the set of virtual machines may be configured as a source for the second instance of the set of virtual machines.

At 630, the data management platform 605 may instantiate, in response to receiving the input, the second instance of the set of virtual machines using the backup configuration for the first instance of the set of virtual machines and the data backed up to the target data storage environment. In some examples, the backup configuration may include at least one of compute resources for the target data storage environment, datastore resource for the target data storage environment, network configuration for the target data storage environment, one or more post scripts, a delay between priority groups of data, or a combination thereof.

At 635, the data management platform 605 may receive, from the user of the data management platform, a deletion request. The deletion request may include an input to delete the second instance of the set of virtual machines at the target data storage environment.

At 640, the data management platform 605 may identify, in response to receiving the second input, a set of configurations associated with the second instance of the set of virtual machines and metadata associated with the second instance of the set of virtual machines. At 645, the data management platform 605 may delete, in response to receiving the second input, the second instance of the set of virtual machines from the target data storage environment. In some examples, deleting the second instance of the set of virtual machines may include deleting the set of configurations associated with the second instance of the set of virtual machines and the metadata associated with the second instance of the set of virtual machines.

Figure 7:
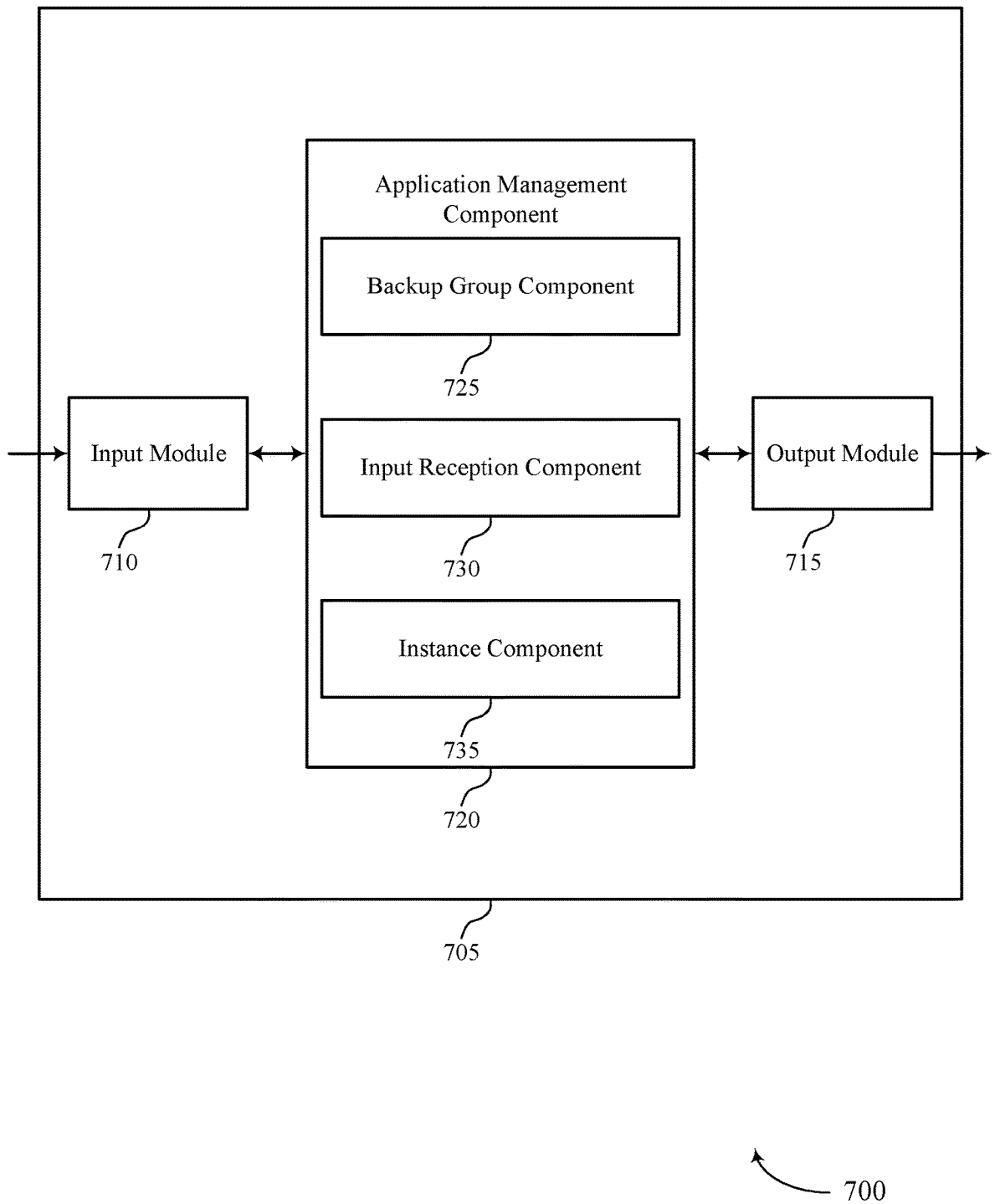
FIG. 7 shows a block diagram of an apparatus that supports techniques for using data backup and disaster recovery configurations for application management in accordance with aspects of the present disclosure.

FIG. 7 shows a block diagram 700 of a system 705 that supports techniques for using data backup and disaster recovery configurations for application management in accordance with aspects of the present disclosure. In some examples, the system 805 may be an example of aspects of one or more components described with reference to FIG. 1, such as a DMS 110. The system 805 may include an input interface 810, an output interface 815, and an application management component 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the application management component 820 to support techniques for using data backup and disaster recovery configurations for application management. In some cases, the input interface 810 may be a component of a network interface 915 as described with reference to FIG. 9.

The output interface 715 may manage output signaling for the system 705. For example, the output interface 715 may receive signaling from other components of the system 705, such as the application management component 720, and may transmit such output signaling corresponding to (e.g., representative of or otherwise based on) such signaling to other systems or devices. In some cases, the output interface 715 may be a component of a network interface 915 as described with reference to FIG. 9.

For example, the application management component 720 may include a backup group component 725, an input reception component 730, an instance component 735, or any combination thereof. In some examples, the application management component 820, or various components thereof, may be configured to perform various operations (e.g., receiving, monitoring, transmitting) using or otherwise in cooperation with the input interface 810, the output interface 815, or both. For example, the application management component 820 may receive information from the input interface 810, send information to the output interface 815, or be integrated in combination with the input interface 810, the output interface 815, or both to receive information, transmit information, or perform various other operations as described herein.

The application management component 720 may support data management in accordance with examples as disclosed herein. The backup group component 725 may be configured as or otherwise support a means for grouping a first instance of a set of multiple virtual machines into a backup group for performing a backup of data from a source data storage environment to a target data storage environment in accordance with a backup configuration. The input reception component 730 may be configured as or otherwise support a means for receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The instance component 735 may be configured as or otherwise support a means for instantiating, in response to receiving the input, the second instance of the set of multiple virtual machines using the backup configuration for the first instance of the set of multiple virtual machines and the data backed up to the target data storage environment.

Figure 8:
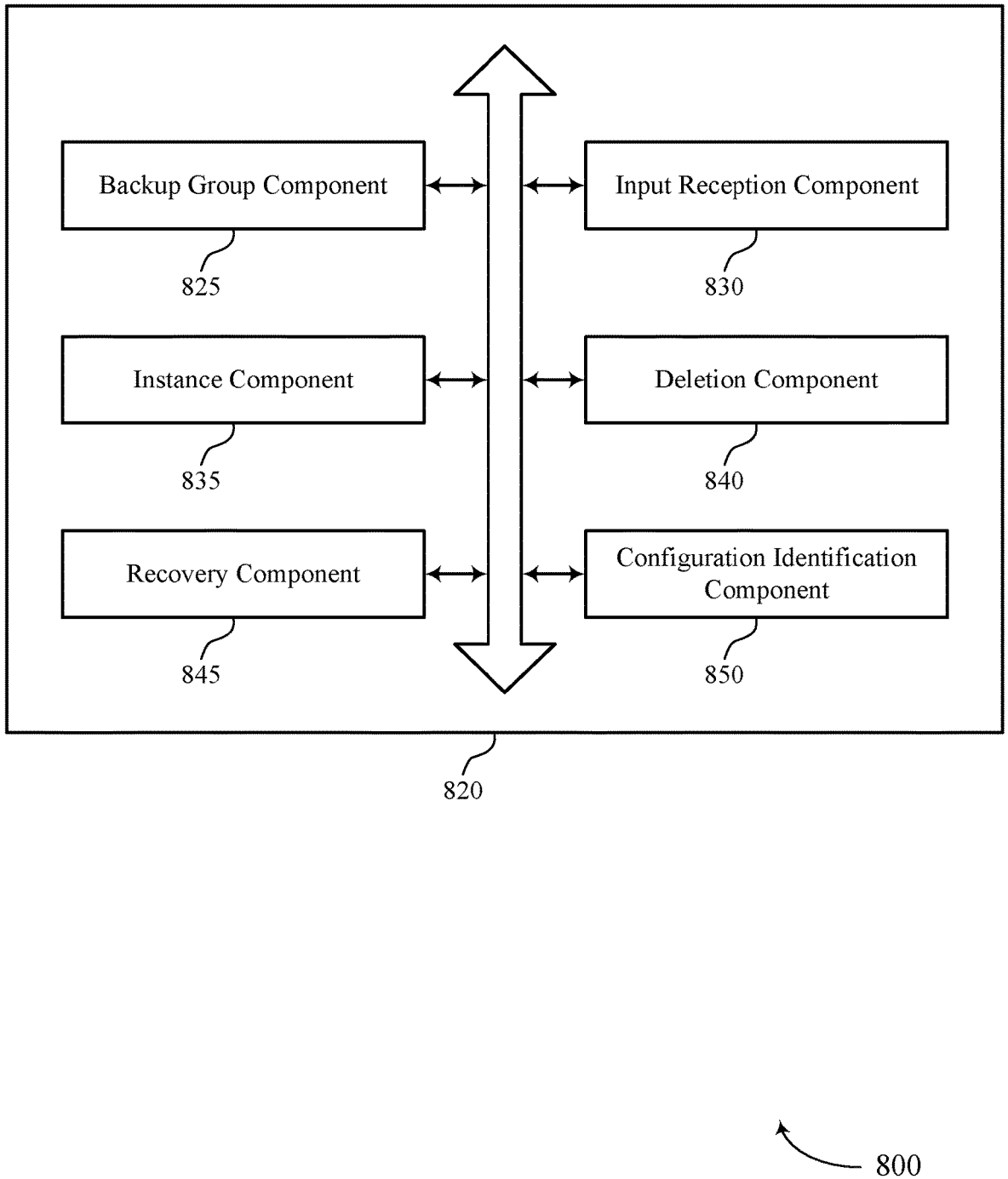
FIG. 8 shows a block diagram of an application management component that supports techniques for using data backup and disaster recovery configurations for application management in accordance with aspects of the present disclosure.

FIG. 8 shows a block diagram 800 of an application management component 820 that supports techniques for using data backup and disaster recovery configurations for application management in accordance with aspects of the present disclosure. The application management component 920 may be an example of or include aspects of an application management component 820 as described herein. The application management component 920, or various components thereof, may be an example of means for performing various aspects of techniques for techniques for using data backup and disaster recovery configurations for application management as described herein. For example, the application management component 920 may include a backup group component 825, an input reception component 830, an instance component 835, a deletion component 840, a recovery component 845, a configuration identification component 850, or any combination thereof. Each of these components may communicate, directly or indirectly, with one another (e.g., via one or more buses, communications links, communications interfaces, or any combination thereof).

The application management component 820 may support data management in accordance with examples as disclosed herein. The backup group component 825 may be configured as or otherwise support a means for grouping a first instance of a set of multiple virtual machines into a backup group for performing a backup of data from a source data storage environment to a target data storage environment in accordance with a backup configuration. The input reception component 830 may be configured as or otherwise support a means for receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The instance component 835 may be configured as or otherwise support a means for instantiating, in response to receiving the input, the second instance of the set of multiple virtual machines using the backup configuration for the first instance of the set of multiple virtual machines and the data backed up to the target data storage environment.

In some examples, the input reception component 830 may be configured as or otherwise support a means for receiving, from the user of the data management platform, a second input to delete the second instance of the set of multiple virtual machines at the target data storage environment. In some examples, the deletion component 840 may be configured as or otherwise support a means for deleting, in response to receiving the second input, the second instance of the set of multiple virtual machines from the target data storage environment.

In some examples, the configuration identification component 850 may be configured as or otherwise support a means for identifying, in response to receiving the second input, a set of configurations associated with the second instance of the set of multiple virtual machines and metadata associated with the second instance of the set of multiple virtual machines, where deleting the second instance of the set of multiple virtual machines includes deleting the set of configurations associated with the second instance of the set of multiple virtual machines and the metadata associated with the second instance of the set of multiple virtual machines.

In some examples, the input reception component 830 may be configured as or otherwise support a means for receiving, from the user of the data management platform, a second input to delete a subset of the set of multiple virtual machines from the second instance of the set of multiple virtual machines at the target data storage environment. In some examples, the deletion component 840 may be configured as or otherwise support a means for deleting, in response to receiving the second input, the subset of the set of multiple virtual machines from the target data storage environment.

In some examples, the recovery component 845 may be configured as or otherwise support a means for receiving, from the user of the data management platform, a request to recover the data from the target data storage environment. In some examples, the recovery component 845 may be configured as or otherwise support a means for recovering, in response to receiving the request, the data from the target data storage environment in accordance with the backup configuration.

In some examples, the input reception component 830 may be configured as or otherwise support a means for receiving, from the user of the data management platform, a second input to create a third instance of a subset of the set of multiple virtual machines at the target data storage environment. In some examples, the instance component 835 may be configured as or otherwise support a means for instantiating, in response to receiving the second input, the third instance of the subset of the set of multiple virtual machines using the backup configuration for the first instance of the set of multiple virtual machines and the data backed up to the target data storage environment. In some examples, the backup group component 825 may be configured as or otherwise support a means for receiving, from the user of the data management platform, the backup configuration for the set of multiple virtual machines.

In some examples, the backup configuration includes at least one of compute resources for the target data storage environment, datastore resource for the target data storage environment, network configuration for the target data storage environment, one or more post scripts, a delay between priority groups of data, or a combination thereof. In some examples, the first instance of the set of multiple virtual machines is independent of the second instance of the set of multiple virtual machines.

Figure 9:
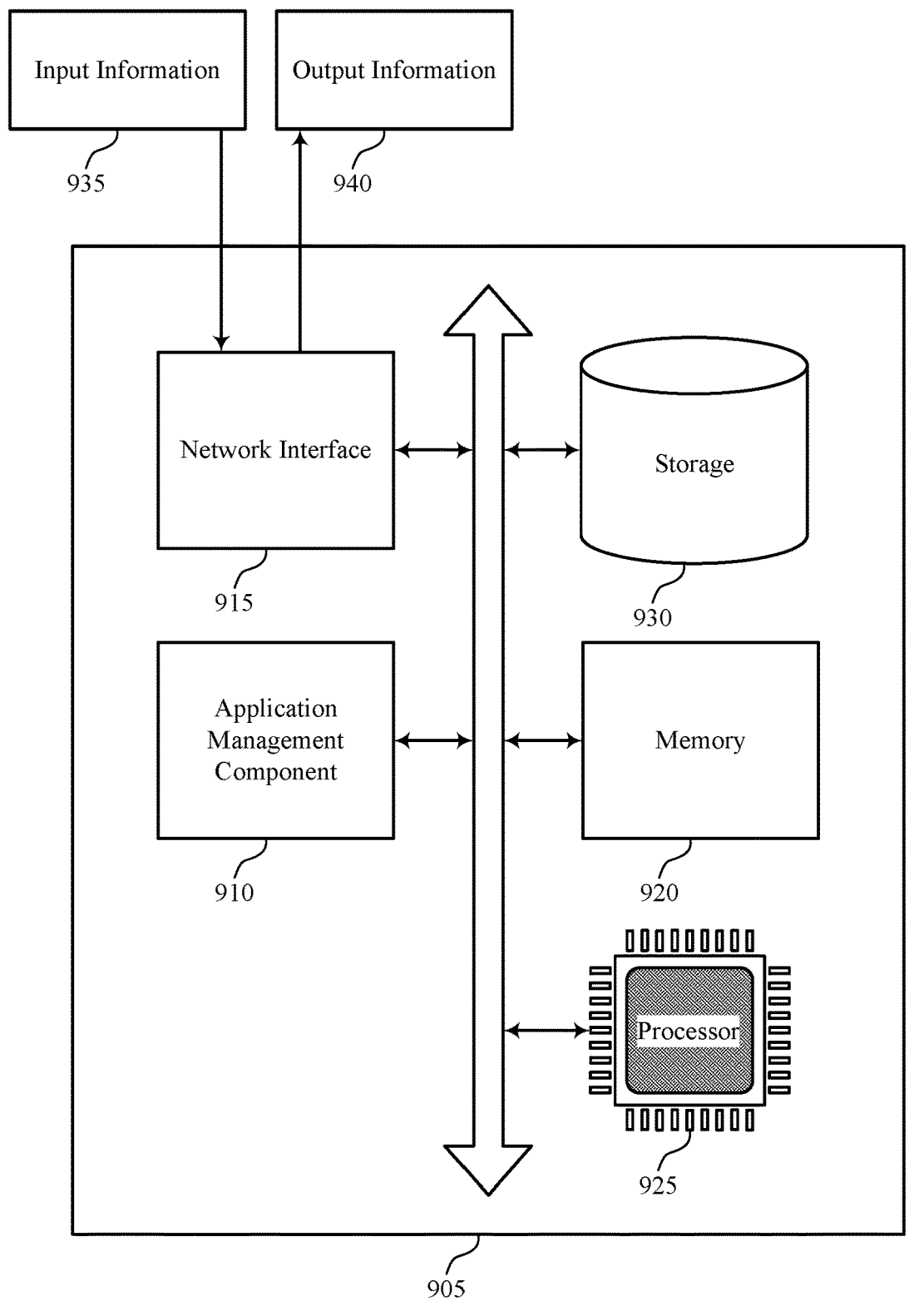
FIG. 9 shows a diagram of a system including a device that supports techniques for using data backup and disaster recovery configurations for application management in accordance with aspects of the present disclosure.

FIG. 9 shows a diagram of a block diagram 900 of a system 905 that supports techniques for using data backup and disaster recovery configurations for application management in accordance with aspects of the present disclosure. The system 1005 may be an example of or include aspects of a system 805 as described herein. The system 1005 may include components for data management, including components such as an application management component 1010, a network interface 1015, memory 1020, processor 1025, and storage 1030. These components may be in electronic communication or otherwise coupled with each other (e.g., operatively, communicatively, functionally, electronically, electrically; via one or more buses, communications links, communications interfaces, or any combination thereof). Additionally, the components of the system 1005 may comprise corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1015 may enable the system 1005 to exchange information (e.g., input information 1035, output information 1040, or both) with other systems or devices (not shown). For example, the network interface 1015 may enable the system 1005 to connect to a network (e.g., a network 120 as described herein). The network interface 1015 may include one or more wireless network interfaces, one or more wired network interfaces, or any combination thereof. In some examples, the network interface 1015 may be an example of may be an example of aspects of one or more components described with reference to FIG. 1, such as one or more network interfaces 165.

Memory 1020 may include RAM, ROM, or both. The memory 1020 may store computer-readable, computer-executable software including instructions that, when executed, cause the processor 1025 to perform various functions described herein. In some cases, the memory 1020 may contain, among other things, a basic input/output system (BIOS), which may control basic hardware or software operation such as the interaction with peripheral components or devices. In some cases, the memory 1020 may be an example of aspects of one or more components described with reference to FIG. 1, such as one or more memories 175.

Figure 10:
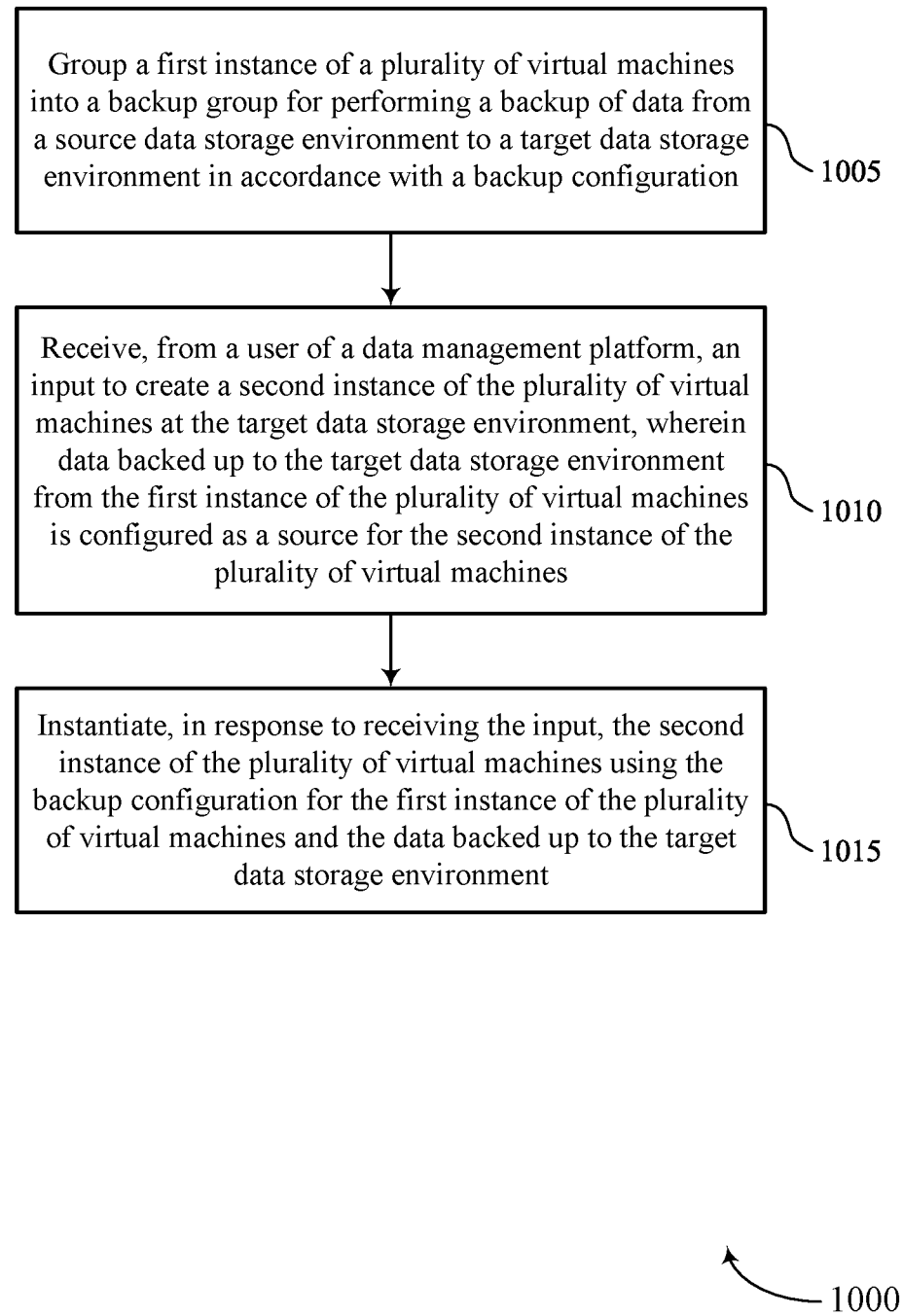
FIGS. 10 through 13 show flowcharts illustrating methods that support techniques for using data backup and disaster recovery configurations for application management in accordance with aspects of the present disclosure.

The processor 1025 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 1025 may be configured to execute computer-readable instructions stored in a memory 1020 to perform various functions (e.g., functions or tasks supporting techniques for using data backup and disaster recovery configurations for application management). Though a single processor 1025 is depicted in the example of FIG. 10, it is to be understood that the system 1005 may include any quantity of one or more of processors 1025 and that a group of processors 1025 may collectively perform one or more functions ascribed herein to a processor, such as the processor 1025. In some cases, the processor 1025 may be an example of aspects of one or more components described with reference to FIG. 1, such as one or more processors 170.

Storage 1030 may be configured to store data that is generated, processed, stored, or otherwise used by the system 1005. In some cases, the storage 1030 may include one or more HDDs, one or more SDDs, or both. In some examples, the storage 1030 may be an example of a single database, a distributed database, multiple distributed databases, a data store, a data lake, or an emergency backup database. In some examples, the storage 1030 may be an example of one or more components described with reference to FIG. 1, such as one or more network disks 180.

The application management component 910 may support data management in accordance with examples as disclosed herein. For example, the application management component 910 may be configured as or otherwise support a means for grouping a first instance of a set of multiple virtual machines into a backup group for performing a backup of data from a source data storage environment to a target data storage environment in accordance with a backup configuration. The application management component 910 may be configured as or otherwise support a means for receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The application management component 910 may be configured as or otherwise support a means for instantiating, in response to receiving the input, the second instance of the set of multiple virtual machines using the backup configuration for the first instance of the set of multiple virtual machines and the data backed up to the target data storage environment.

By including or configuring the application management component 1010 in accordance with examples as described herein, the system 1005 may support techniques for techniques for using data backup and disaster recovery configurations for application management, which may provide one or more benefits such as, for example, enhanced data management using disaster recovery configurations, among other possibilities.

FIG. 10 shows a flowchart illustrating a method 1000 that supports techniques for using data backup and disaster recovery configurations for application management in accordance with aspects of the present disclosure. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1005, the method may include grouping a first instance of a set of multiple virtual machines into a backup group for performing a backup of data from a source data storage environment to a target data storage environment in accordance with a backup configuration. The operations of 1005 may be performed in accordance with examples as disclosed herein. In some examples, aspects of the operations of 1005 may be performed by a backup group component 825 as described with reference to FIG. 8.

At 1010, the method may include receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The operations of 1010 may be performed in accordance with examples as disclosed herein. In some examples, aspects of the operations of 1010 may be performed by an input reception component 830 as described with reference to FIG. 8.

At 1015, the method may include instantiating, in response to receiving the input, the second instance of the set of multiple virtual machines using the backup configuration for the first instance of the set of multiple virtual machines and the data backed up to the target data storage environment. The operations of 1015 may be performed in accordance with examples as disclosed herein. In some examples, aspects of the operations of 1015 may be performed by an instance component 835 as described with reference to FIG. 8.

Figure 11:
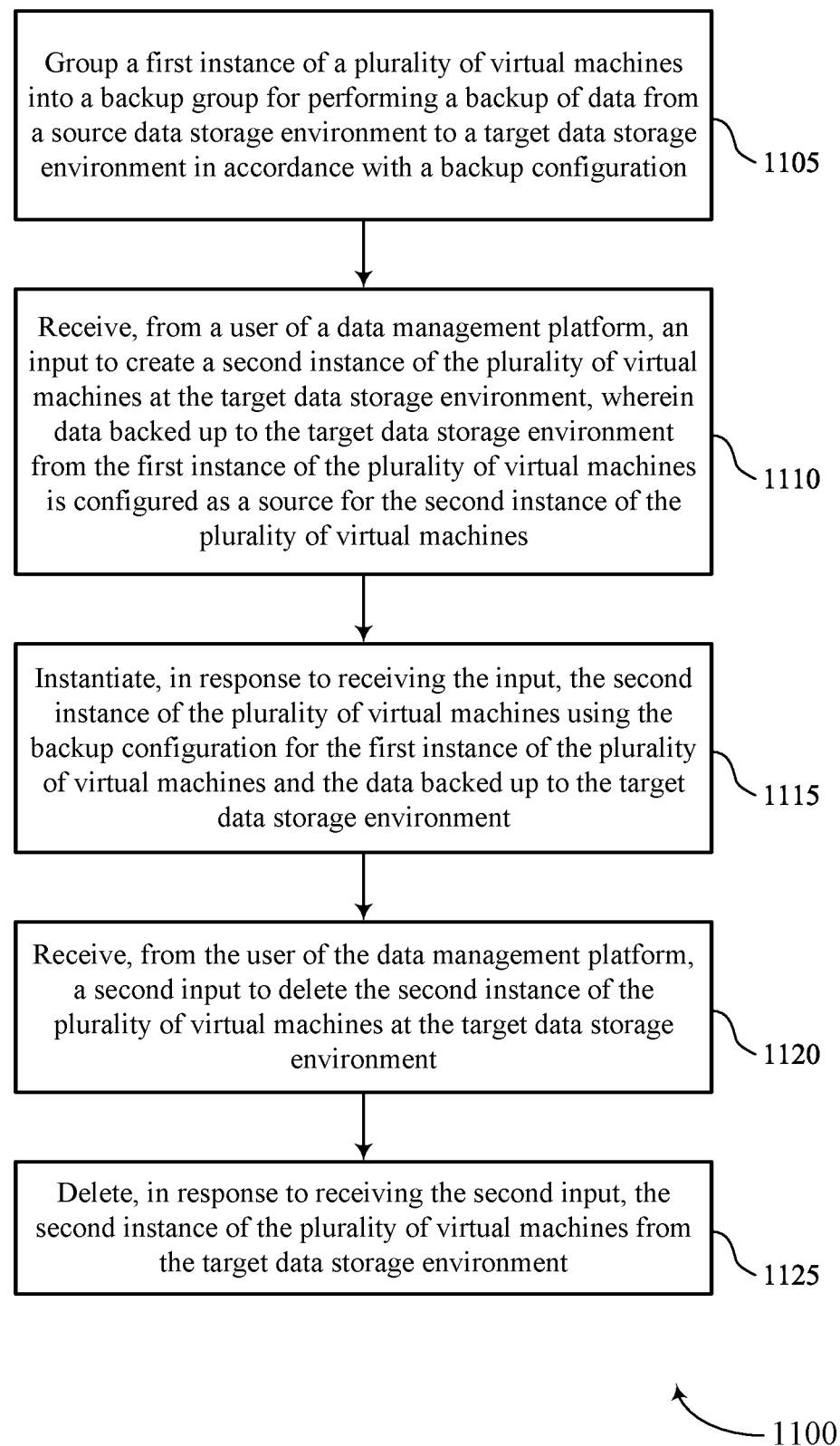

FIG. 11 shows a flowchart illustrating a method 1100 that supports techniques for using data backup and disaster recovery configurations for application management in accordance with aspects of the present disclosure. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include grouping a first instance of a set of multiple virtual machines into a backup group for performing a backup of data from a source data storage environment to a target data storage environment in accordance with a backup configuration. The operations of 1105 may be performed in accordance with examples as disclosed herein. In some examples, aspects of the operations of 1105 may be performed by a backup group component 825 as described with reference to FIG. 8.

At 1110, the method may include receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The operations of 1110 may be performed in accordance with examples as disclosed herein. In some examples, aspects of the operations of 1110 may be performed by an input reception component 830 as described with reference to FIG. 8.

At 1115, the method may include instantiating, in response to receiving the input, the second instance of the set of multiple virtual machines using the backup configuration for the first instance of the set of multiple virtual machines and the data backed up to the target data storage environment. The operations of 1115 may be performed in accordance with examples as disclosed herein. In some examples, aspects of the operations of 1115 may be performed by an instance component 835 as described with reference to FIG. 8.

At 1120, the method may include receiving, from the user of the data management platform, a second input to delete the second instance of the set of multiple virtual machines at the target data storage environment. The operations of 1120 may be performed in accordance with examples as disclosed herein. In some examples, aspects of the operations of 1120 may be performed by an input reception component 830 as described with reference to FIG. 8.

At 1125, the method may include deleting, in response to receiving the second input, the second instance of the set of multiple virtual machines from the target data storage environment. The operations of 1125 may be performed in accordance with examples as disclosed herein. In some examples, aspects of the operations of 1125 may be performed by a deletion component 840 as described with reference to FIG. 8.

Figure 12:
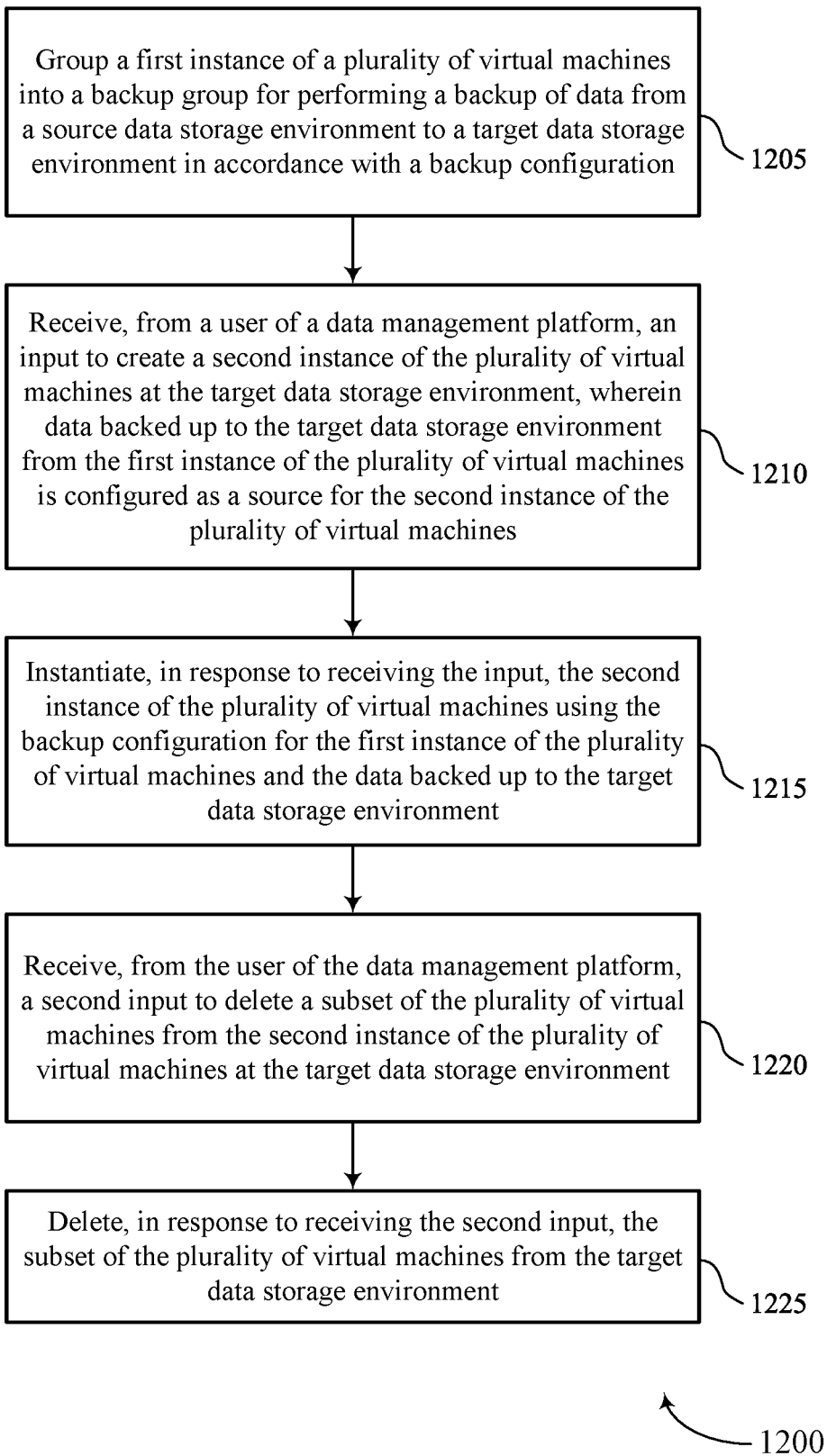

FIG. 12 shows a flowchart illustrating a method 1200 that supports techniques for using data backup and disaster recovery configurations for application management in accordance with aspects of the present disclosure. For example, the operations of the method 1200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include grouping a first instance of a set of multiple virtual machines into a backup group for performing a backup of data from a source data storage environment to a target data storage environment in accordance with a backup configuration. The operations of 1205 may be performed in accordance with examples as disclosed herein. In some examples, aspects of the operations of 1205 may be performed by a backup group component 825 as described with reference to FIG. 8.

At 1210, the method may include receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The operations of 1210 may be performed in accordance with examples as disclosed herein. In some examples, aspects of the operations of 1210 may be performed by an input reception component 830 as described with reference to FIG. 8.

At 1215, the method may include instantiating, in response to receiving the input, the second instance of the set of multiple virtual machines using the backup configuration for the first instance of the set of multiple virtual machines and the data backed up to the target data storage environment. The operations of 1215 may be performed in accordance with examples as disclosed herein. In some examples, aspects of the operations of 1215 may be performed by an instance component 835 as described with reference to FIG. 8.

At 1220, the method may include receiving, from the user of the data management platform, a second input to delete a subset of the set of multiple virtual machines from the second instance of the set of multiple virtual machines at the target data storage environment. The operations of 1220 may be performed in accordance with examples as disclosed herein. In some examples, aspects of the operations of 1220 may be performed by an input reception component 830 as described with reference to FIG. 8.

At 1225, the method may include deleting, in response to receiving the second input, the subset of the set of multiple virtual machines from the target data storage environment. The operations of 1225 may be performed in accordance with examples as disclosed herein. In some examples, aspects of the operations of 1225 may be performed by a deletion component 840 as described with reference to FIG. 8.

Figure 13:
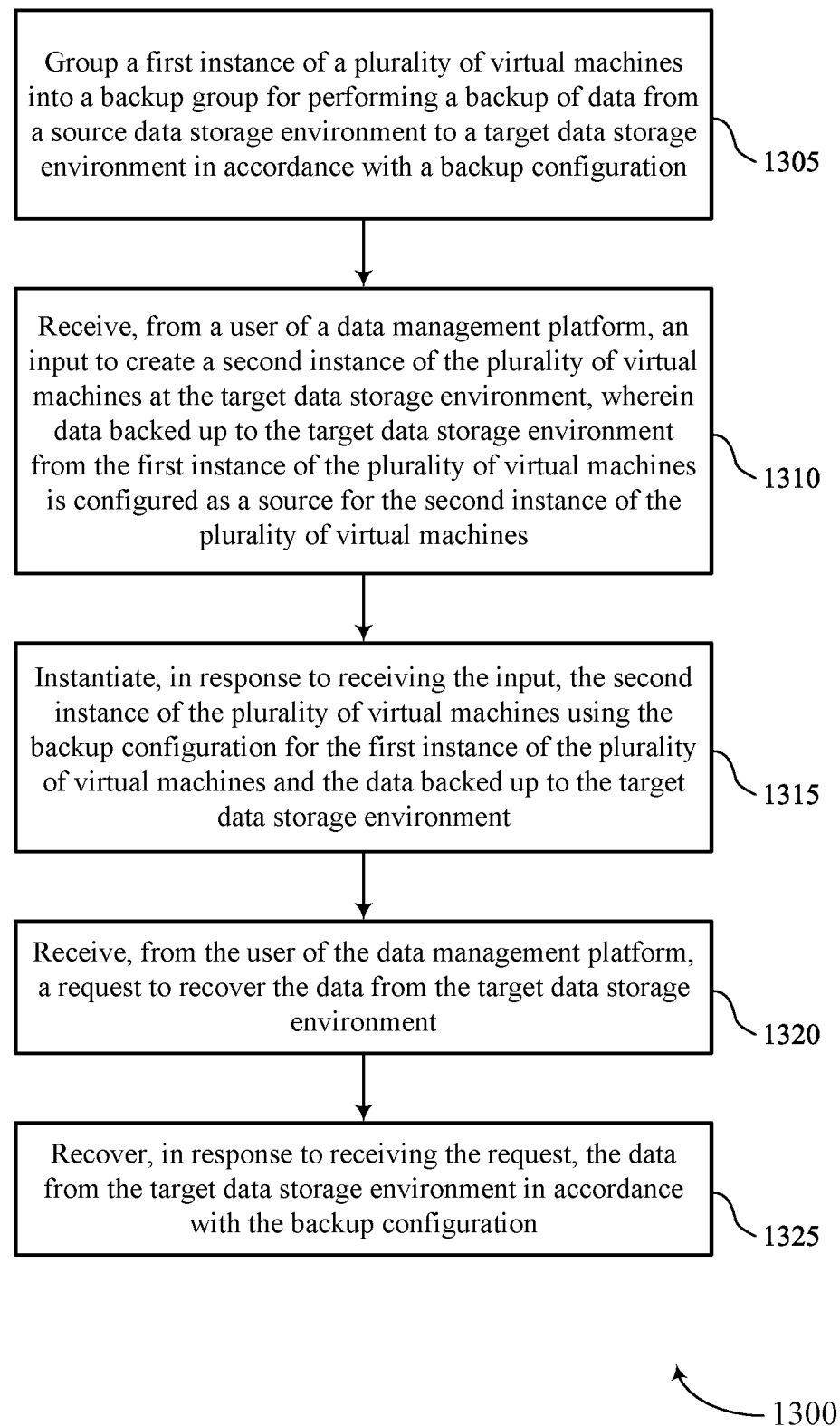

FIG. 13 shows a flowchart illustrating a method 1300 that supports techniques for using data backup and disaster recovery configurations for application management in accordance with aspects of the present disclosure. For example, the operations of the method 1300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include grouping a first instance of a set of multiple virtual machines into a backup group for performing a backup of data from a source data storage environment to a target data storage environment in accordance with a backup configuration. The operations of 1305 may be performed in accordance with examples as disclosed herein. In some examples, aspects of the operations of 1305 may be performed by a backup group component 825 as described with reference to FIG. 8.

At 1310, the method may include receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines. The operations of 1310 may be performed in accordance with examples as disclosed herein. In some examples, aspects of the operations of 1310 may be performed by an input reception component 830 as described with reference to FIG. 8.

At 1315, the method may include instantiating, in response to receiving the input, the second instance of the set of multiple virtual machines using the backup configuration for the first instance of the set of multiple virtual machines and the data backed up to the target data storage environment. The operations of 1315 may be performed in accordance with examples as disclosed herein. In some examples, aspects of the operations of 1315 may be performed by an instance component 835 as described with reference to FIG. 8.

At 1320, the method may include receiving, from the user of the data management platform, a request to recover the data from the target data storage environment. The operations of 1320 may be performed in accordance with examples as disclosed herein. In some examples, aspects of the operations of 1320 may be performed by a recovery component 845 as described with reference to FIG. 8.

At 1325, the method may include recovering, in response to receiving the request, the data from the target data storage environment in accordance with the backup configuration. The operations of 1325 may be performed in accordance with examples as disclosed herein. In some examples, aspects of the operations of 1325 may be performed by a recovery component 845 as described with reference to FIG. 8.

A method for data management is described. The method may include grouping a first instance of a set of multiple virtual machines into a backup group for performing a backup of data from a source data storage environment to a target data storage environment in accordance with a backup configuration, receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines, and instantiating, in response to receiving the input, the second instance of the set of multiple virtual machines using the backup configuration for the first instance of the set of multiple virtual machines and the data backed up to the target data storage environment.

An apparatus for data management is described. The apparatus may include a processor, memory coupled with the processor, and instructions stored in the memory. The instructions may be executable by the processor to cause the apparatus to group a first instance of a set of multiple virtual machines into a backup group for performing a backup of data from a source data storage environment to a target data storage environment in accordance with a backup configuration, receive, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines, and instantiate, in response to receiving the input, the second instance of the set of multiple virtual machines using the backup configuration for the first instance of the set of multiple virtual machines and the data backed up to the target data storage environment.

Another apparatus for data management is described. The apparatus may include means for grouping a first instance of a set of multiple virtual machines into a backup group for performing a backup of data from a source data storage environment to a target data storage environment in accordance with a backup configuration, means for receiving, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines, and means for instantiating, in response to receiving the input, the second instance of the set of multiple virtual machines using the backup configuration for the first instance of the set of multiple virtual machines and the data backed up to the target data storage environment.

A non-transitory computer-readable medium storing code for data management is described. The code may include instructions executable by a processor to group a first instance of a set of multiple virtual machines into a backup group for performing a backup of data from a source data storage environment to a target data storage environment in accordance with a backup configuration, receive, from a user of a data management platform, an input to create a second instance of the set of multiple virtual machines at the target data storage environment, where data backed up to the target data storage environment from the first instance of the set of multiple virtual machines is configured as a source for the second instance of the set of multiple virtual machines, and instantiate, in response to receiving the input, the second instance of the set of multiple virtual machines using the backup configuration for the first instance of the set of multiple virtual machines and the data backed up to the target data storage environment.

Some examples of the method, apparatuses, and non-transitory computer-readable medium described herein may further include operations, features, means, or instructions for receiving, from the user of the data management platform, a second input to delete the second instance of the set of multiple virtual machines at the target data storage environment and deleting, in response to receiving the second input, the second instance of the set of multiple virtual machines from the target data storage environment.

Some examples of the method, apparatuses, and non-transitory computer-readable medium described herein may further include operations, features, means, or instructions for identifying, in response to receiving the second input, a set of configurations associated with the second instance of the set of multiple virtual machines and metadata associated with the second instance of the set of multiple virtual machines, where deleting the second instance of the set of multiple virtual machines includes deleting the set of configurations associated with the second instance of the set of multiple virtual machines and the metadata associated with the second instance of the set of multiple virtual machines.

Some examples of the method, apparatuses, and non-transitory computer-readable medium described herein may further include operations, features, means, or instructions for receiving, from the user of the data management platform, a second input to delete a subset of the set of multiple virtual machines from the second instance of the set of multiple virtual machines at the target data storage environment and deleting, in response to receiving the second input, the subset of the set of multiple virtual machines from the target data storage environment.

Some examples of the method, apparatuses, and non-transitory computer-readable medium described herein may further include operations, features, means, or instructions for receiving, from the user of the data management platform, a request to recover the data from the target data storage environment and recovering, in response to receiving the request, the data from the target data storage environment in accordance with the backup configuration.

Some examples of the method, apparatuses, and non-transitory computer-readable medium described herein may further include operations, features, means, or instructions for receiving, from the user of the data management platform, a second input to create a third instance of a subset of the set of multiple virtual machines at the target data storage environment and instantiating, in response to receiving the second input, the third instance of the subset of the set of multiple virtual machines using the backup configuration for the first instance of the set of multiple virtual machines and the data backed up to the target data storage environment.

Some examples of the method, apparatuses, and non-transitory computer-readable medium described herein may further include operations, features, means, or instructions for receiving, from the user of the data management platform, the backup configuration for the set of multiple virtual machines.

In some examples of the method, apparatuses, and non-transitory computer-readable medium described herein, the backup configuration includes at least one of compute resources for the target data storage environment, datastore resource for the target data storage environment, network configuration for the target data storage environment, one or more post scripts, a delay between priority groups of data, or a combination thereof.

In some examples of the method, apparatuses, and non-transitory computer-readable medium described herein, the first instance of the set of multiple virtual machines may be independent of the second instance of the set of multiple virtual machines.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from a user of a data management platform, a backup configuration defining a first plurality of virtual machines as part of a common application, the first plurality of virtual machines configured to run one or more applications;

grouping a first instance of the first plurality of virtual machines into a backup group for performing a backup of data from a source data storage environment to a target data storage environment in accordance with the backup configuration;

receiving, from the user of the data management platform, an input to create a second instance comprising a second plurality of virtual machines at the target data storage environment, the second plurality of virtual machines configured to run one or more applications, wherein data backed up to the target data storage environment from the first instance of the first plurality of virtual machines is configured as a source for the second instance of the second plurality of virtual machines; and instantiating, in response to receiving the input, the second instance of the second plurality of virtual machines using the backup configuration for the first instance of the first plurality of virtual machines and the data backed up to the target data storage environment, wherein the second plurality of virtual machines is configured to run independently from the first plurality of virtual machines and comprises a replica of the first plurality of virtual machines.

2. The method of claim 1, further comprising:

receiving, from the user of the data management platform, a second input to delete the second instance of the second plurality of virtual machines at the target data storage environment; and deleting, in response to receiving the second input, the second instance of the second plurality of virtual machines from the target data storage environment.

3. The method of claim 2, further comprising:

identifying, in response to receiving the second input, a set of configurations associated with the second instance of the second plurality of virtual machines and metadata associated with the second instance of the second plurality of virtual machines, wherein deleting the second instance of the second plurality of virtual machines comprises deleting the set of configurations associated with the second instance of the second plurality of virtual machines and the metadata associated with the second instance of the second plurality of virtual machines.

4. The method of claim 1, further comprising:

receiving, from the user of the data management platform, a second input to delete a subset of the first plurality of virtual machines from the second instance of the second plurality of virtual machines at the target data storage environment; and deleting, in response to receiving the second input, the subset of the first plurality of virtual machines from the target data storage environment.

5. The method of claim 1, further comprising:

receiving, from the user of the data management platform, a request to recover the data from the target data storage environment; and recovering, in response to receiving the request, the data from the target data storage environment in accordance with the backup configuration.

6. The method of claim 1, further comprising:

receiving, from the user of the data management platform, a second input to create a third instance of a subset of the first plurality of virtual machines at the target data storage environment; and instantiating, in response to receiving the second input, the third instance of the subset of the first plurality of virtual machines using the backup configuration for the first instance of the first plurality of virtual machines and the data backed up to the target data storage environment.

7. The method of claim 1, further comprising:

receiving, from the user of the data management platform, the backup configuration for the first plurality of virtual machines.

8. The method of claim 7, wherein the backup configuration comprises at least one of compute resources for the target data storage environment, datastore resource for the target data storage environment, network configuration for the target data storage environment, one or more post scripts, a delay between priority groups of data, or a combination thereof.

9. The method of claim 1, wherein the first instance of the first plurality of virtual machines is independent of the second instance of the second plurality of virtual machines.

10. An apparatus, comprising:

a processor;

memory coupled with the processor; and instructions stored in the memory and executable by the processor to cause the apparatus to:

receive, from a user of a data management platform, a backup configuration defining a first plurality of virtual machines as part of a common application, the first plurality of virtual machines configured to run one or more applications;

group a first instance of the first plurality of virtual machines into a backup group for performing a backup of data from a source data storage environment to a target data storage environment in accordance with the backup configuration;

receive, from the user of the data management platform, an input to create a second instance comprising a second plurality of virtual machines at the target data storage environment, the second plurality of virtual machines configured to run one or more applications, wherein data backed up to the target data storage environment from the first instance of the first plurality of virtual machines is configured as a source for the second instance of the second plurality of virtual machines; and instantiate, in response to receiving the input, the second instance of the second plurality of virtual machines using the backup configuration for the first instance of the first plurality of virtual machines and the data backed up to the target data storage environment, wherein the second plurality of virtual machines is configured to run independently from the first plurality of virtual machines and comprises a replica of the first plurality of virtual machines.

11. The apparatus of claim 10, wherein the instructions are further executable by the processor to cause the apparatus to:

receive, from the user of the data management platform, a second input to delete the second instance of the second plurality of virtual machines at the target data storage environment; and delete, in response to receiving the second input, the second instance of the second plurality of virtual machines from the target data storage environment.

12. The apparatus of claim 11, wherein the instructions are further executable by the processor to cause the apparatus to:
  identify, in response to receiving the second input, a set of configurations associated with the second instance of the second plurality of virtual machines and metadata associated with the second instance of the second plurality of virtual machines, wherein deleting the second instance of the second plurality of virtual machines comprises deleting the set of configurations associated with the second instance of the second plurality of virtual machines and the metadata associated with the second instance of the second plurality of virtual machines.

13. The apparatus of claim 10, wherein the instructions are further executable by the processor to cause the apparatus to:
  receive, from the user of the data management platform, a second input to delete a subset of the first plurality of virtual machines from the second instance of the second plurality of virtual machines at the target data storage environment; and
  delete, in response to receiving the second input, the subset of the first plurality of virtual machines from the target data storage environment.

14. The apparatus of claim 10, wherein the instructions are further executable by the processor to cause the apparatus to:
  receive, from the user of the data management platform, a request to recover the data from the target data storage environment; and
  recover, in response to receiving the request, the data from the target data storage environment in accordance with the backup configuration.

15. The apparatus of claim 10, wherein the instructions are further executable by the processor to cause the apparatus to:
  receive, from the user of the data management platform, a second input to create a third instance of a subset of the first plurality of virtual machines at the target data storage environment; and
  instantiate, in response to receiving the second input, the third instance of the subset of the first plurality of virtual machines using the backup configuration for the first instance of the first plurality of virtual machines and the data backed up to the target data storage environment.

16. The apparatus of claim 10, wherein the instructions are further executable by the processor to cause the apparatus to:
  receive, from the user of the data management platform, the backup configuration for the first plurality of virtual machines.

17. The apparatus of claim 16, wherein the backup configuration comprises at least one of compute resources for the target data storage environment, datastore resource for the target data storage environment, network configuration for the target data storage environment, one or more post scripts, a delay between priority groups of data, or a combination thereof.

18. The apparatus of claim 10, wherein the first instance of the first plurality of virtual machines is independent of the second instance of the second plurality of virtual machines.

19. A non-transitory computer-readable medium storing code, the code comprising instructions executable by a processor to:
  receive, from a user of a data management platform, a backup configuration defining a first plurality of virtual machines as part of a common application, the first plurality of virtual machines configured to run one or more applications;
  group a first instance of the first plurality of virtual machines into a backup group for performing a backup of data from a source data storage environment to a target data storage environment in accordance with the backup configuration;
  receive, from the user of the data management platform, an input to create a second instance comprising a second plurality of virtual machines at the target data storage environment, the second plurality of virtual machines configured to run one or more applications, wherein data backed up to the target data storage environment from the first instance of the first plurality of virtual machines is configured as a source for the second instance of the second plurality of virtual machines; and
  instantiate, in response to receiving the input, the second instance of the second plurality of virtual machines using the backup configuration for the first instance of the first plurality of virtual machines and the data backed up to the target data storage environment, wherein the second plurality of virtual machines is configured to run independently from the first plurality of virtual machines and comprises a replica of the first plurality of virtual machines.

20. The non-transitory computer-readable medium of claim 19, wherein the instructions are further executable by the processor to:
  receive, from the user of the data management platform, a second input to delete the second instance of the second plurality of virtual machines at the target data storage environment; and
  delete, in response to receiving the second input, the second instance of the second plurality of virtual machines from the target data storage environment.

* * * * *